(12) United States Patent
Traut et al.

(10) Patent No.: US 7,475,183 B2
(45) Date of Patent: Jan. 6, 2009

(54) LARGE PAGE OPTIMIZATIONS IN A VIRTUAL MACHINE ENVIRONMENT

(75) Inventors: Eric P. Traut, Bellevue, WA (US); Idan Avraham, Seattle, WA (US); Matthew D. Hendel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/299,409

(22) Filed: Dec. 12, 2005

(65) Prior Publication Data

US 2007/0136506 A1 Jun. 14, 2007

(51) Int. Cl.
*G06F 12/10* (2006.01)
(52) U.S. Cl. .......................... 711/6; 711/206
(58) Field of Classification Search ............ 711/6, 711/206
See application file for complete search history.

(56) References Cited

U.S. PATENT DOCUMENTS

2004/0064668 A1* 4/2004 Kjos et al. ............... 711/202
2004/0215918 A1* 10/2004 Jacobs et al. ............ 711/207
2006/0174053 A1* 8/2006 Anderson et al. ........... 711/6

OTHER PUBLICATIONS

Hennessy, John L and Patterson, David A, Computer Organization and Design, 1998, Morgan Kaufmann Publishers, Inc., second edition, pp. 580-585.*

Xen Interface Manual, Xen v2.0 for x86, 2004, retreived from internet Jul. 18, 2008 [url: http://www.xen.org/files/xen_interface.pdf].*

* cited by examiner

*Primary Examiner*—Kevin L Ellis
*Assistant Examiner*—Jared I Rutz
(74) *Attorney, Agent, or Firm*—Woodcock Washburn LLP

(57) ABSTRACT

Provided are optimizations to the memory virtualization model employed in a virtual machine environment. An opportunistic hypervisor page mapping process is used in order to utilize large memory pages in a virtual machine environment. Using these optimizations, physical memory is being virtualized for the virtual machine in a manner that allows the operating system (OS) running within the virtual machine to take real and full advantage of large physical memory pages.

20 Claims, 7 Drawing Sheets

LARGE PAGE OPTIMIZATIONS IN A VIRTUAL MACHINE ENVIRONMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2005, Microsoft Corp.

BACKGROUND

Current virtual memory operating systems (OSs) use large memory pages in order to speed up virtual-to-physical address translation and in order to make a more efficient use of the processor's translation look-aside buffer (TLB). This allows such operating systems to boost overall performance by mapping OS code and data to large physical pages. Applications running within the OS are also able to map certain regions of their virtual address space to large physical pages.

When the OS runs within a virtual machine, an extra level of indirection is added to the address translation process. This happens because when the OS running inside the virtual machine references physical memory, it essentially references an abstraction layer that needs to be further translated to the underlying physical memory on the actual hardware. This extra level of indirection causes a situation in which the OS (when running inside a virtual machine) uses large physical pages, but the extra translation causes the underlying machine physical memory to reside in sparse machine physical pages that can not be treated as a large page. The end result is that even though the OS intended to optimize address translation by using large pages, the actual address translation performed on behalf of the virtual machine will be done using small pages. This will, in turn, degrade the overall OS performance.

In this regard, there is a need for processes and systems that address the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, large page optimizations in a virtual machine environment are provided. For several embodiments, a method for utilizing memory pages in a virtual machine environment comprises detecting system physical address (SPA) pages of a particular size allocated by a system component, as shadow page table entries are populated with SPA pages of a smaller size than the SPA pages of a particular size allocated by the system component. The detecting may comprise associating the previously allocated (SPA) pages of a particular size with contiguous and naturally aligned portions of a partition's Guest Physical Address (GPA) space and then populating the shadow page tables (SPTs) with an SPA page mapping to pages of the particular size if the following three conditions are true: a GPA page of the particular size is mapped into a guest virtual address by the guest operating system (OS), appropriate consecutive Shadow Page Table entries are found, and all SPT entries have the same applicable attributes. If one of the above three conditions is not true, the GPA page is mapped using multiple, smaller-sized pages within the SPT.

A second alternative process involves checking where physical address (SPA) pages of a particular size in a pool of SPA pages of the particular size. If there are SPA pages of a particular size in the pool, then a query is made for a list of large GPA pages of the particular size that a guest mapped into its guest virtual address (GVA) space as pages of the particular size. If the list is retrieved and is not empty, then existing GPA-to-SPA mappings are replaced so that reported GPA pages in the list of the particular size point to SPA pages of the particular size. Furthermore, shadow page tables are automatically flushed and then the shadow page tables are populated such that the large SPA pages of the particular size are used.

Other advantages and features are described below.

BRIEF DESCRIPTION OF THE DRAWINGS

Large page optimizations in a virtual machine environment are described further with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
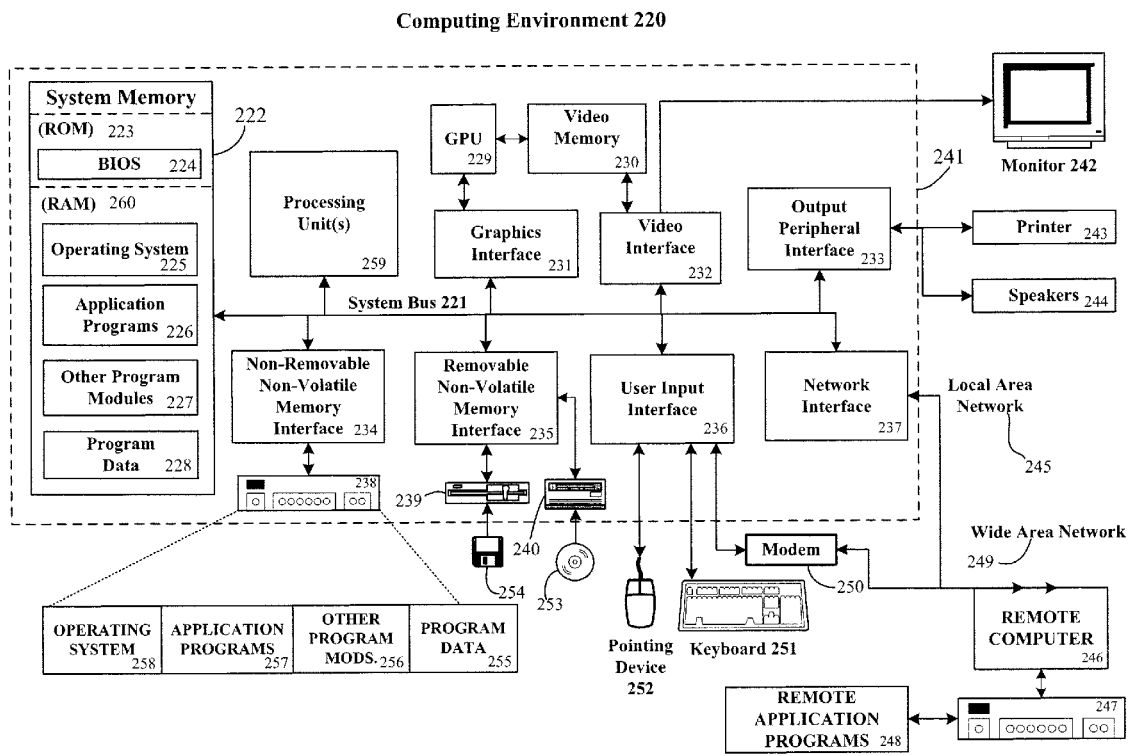
FIG. 1 is a block diagram representing an exemplary computing device suitable for use in conjunction with implementing the processes of large page optimizations in a virtual machine environment.

Referring next to FIG. 1, shown is a block diagram representing an exemplary computing device suitable for use in conjunction with implementing the processes described above. For example, the computer executable instructions that carry out the processes and methods for large page optimizations in a virtual machine environment may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS); containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
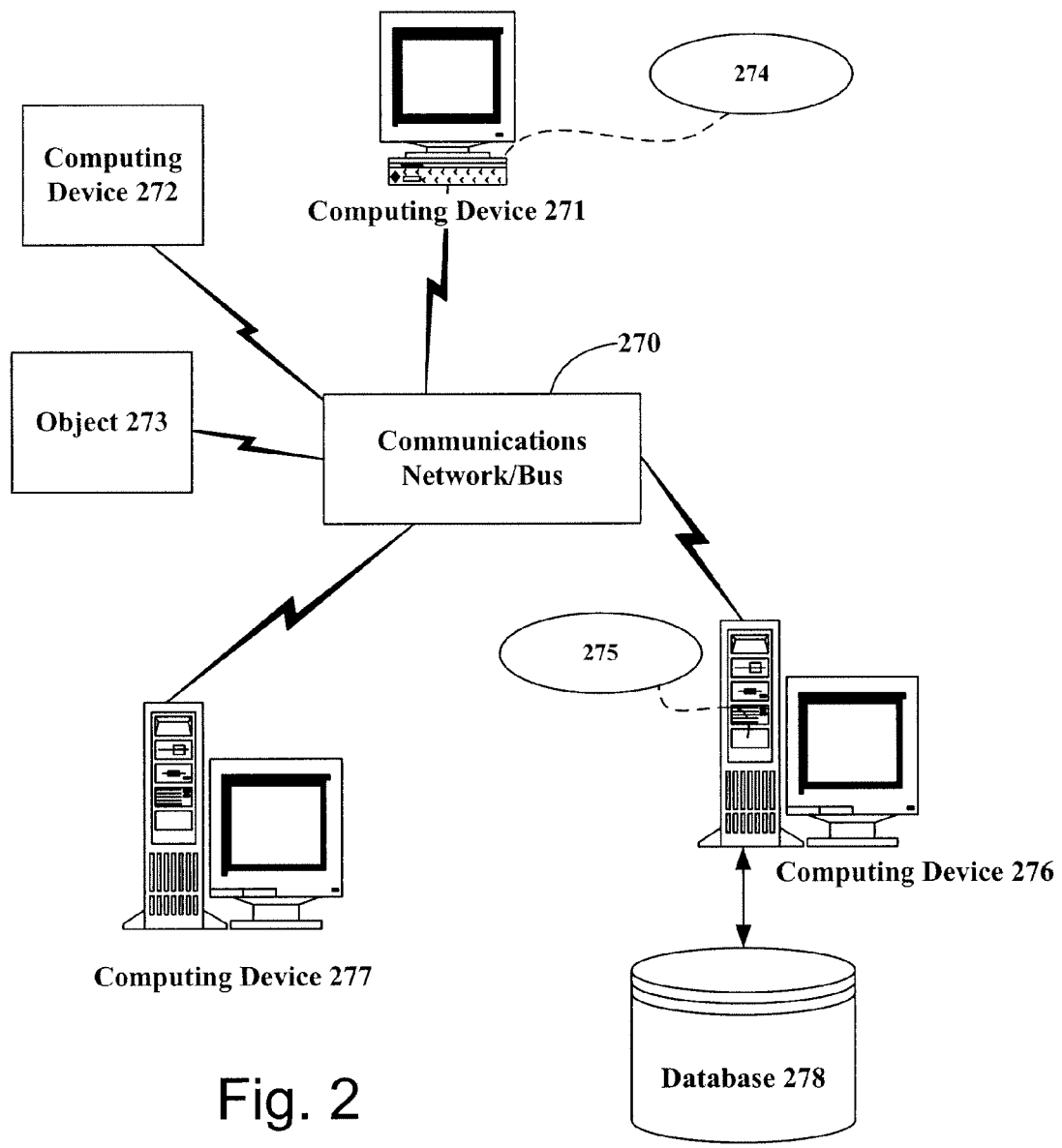
FIG. 2 illustrates an exemplary networked computing environment in which many computerized processes may be implemented to perform the just-in-time compilation processes of large page optimizations in a virtual machine environment.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing large page optimizations in a virtual machine environment. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the invention should not be limited to any single embodiment, but rather should be construed in breadth and scope in accordance with the appended claims.

It is important to understand the problem domain within which performing large page optimizations in a virtual machine environment resides. First provided below is description basic concepts that are related to memory virtualization in a hypervisor environment. Then, a description is provided regarding the manner in which Operating Systems (OSs) use large pages and why it is important to provide the same functionality to Operating Systems that run in a Virtual Machine environment. Later on, described are the two optimization methods that allow the utilization of large pages in a hypervisor environment.

Figure 3:
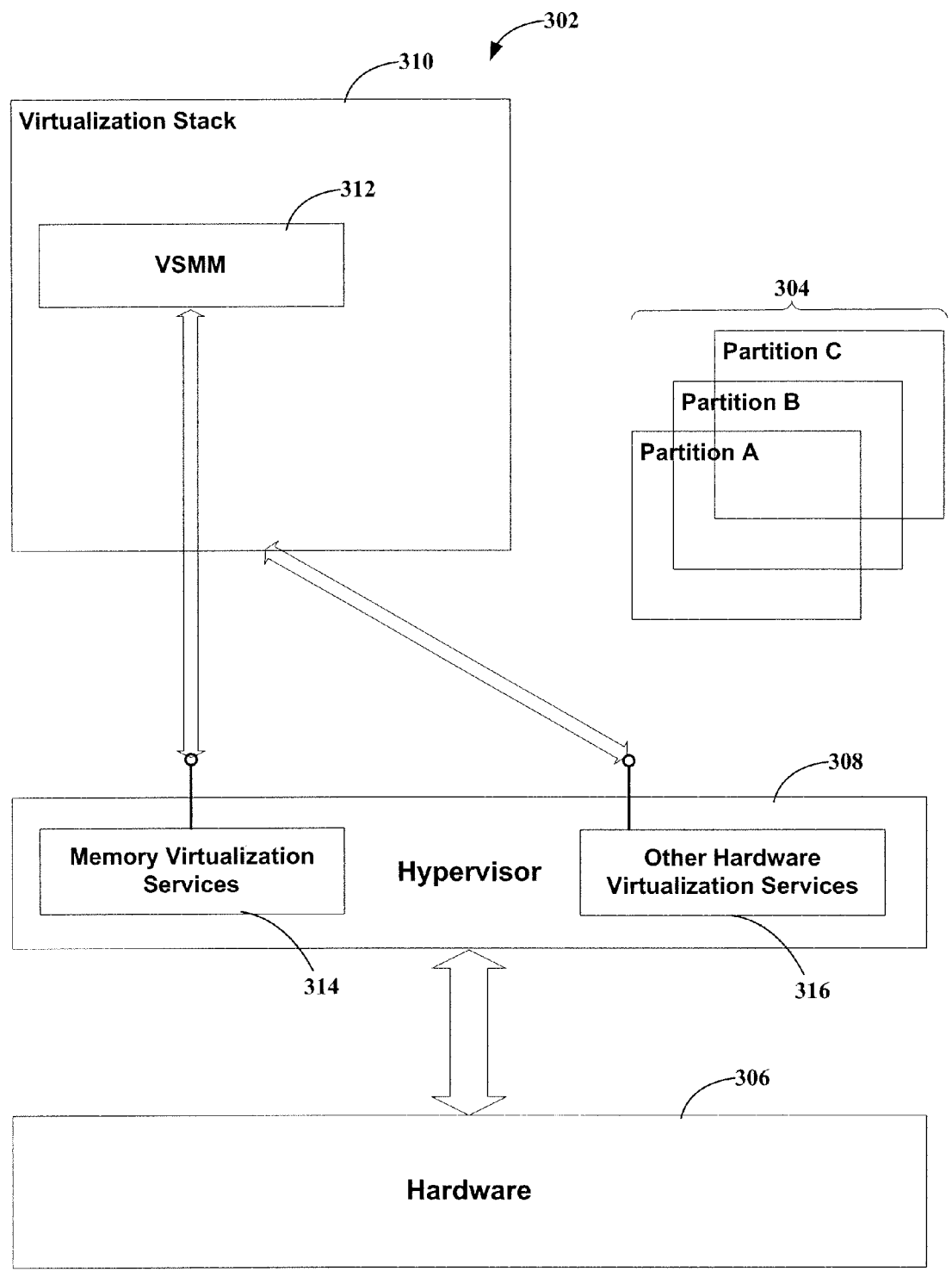
FIG. 3 illustrates, as an example, the manner in which the different system subcomponents interact with each other in a virtual machine environment using a hypervisor.

Referring next to FIG. 3, illustrated, as an example, is the manner in which the different system subcomponents interact with each other in a virtual machine environment 302 using a hypervisor 308. A Virtual Machine environment 302 is a system environment that enables the creation of isolated Partitions 304 (i.e., Virtual Machines) and the ability to run an OS within each Partition 304. The OS running within a Partition 304 is referred to as the guest OS (or simply the guest). The Virtual Machine environment allows multiple Partitions 304 to be created on the same physical hardware 306 such that each guest OS gets the illusion that it runs on its own dedicated hardware.

The hypervisor 308 is the system software module that owns and controls certain machine resources such as system memory, I/O ports etc. Even though the hypervisor 308 provides functionality that allows the virtualization of various hardware resources, there are higher level system components that are in charge of performing partition management, resource allocation, etc. The set of subcomponents that utilize the various hypervisor hardware virtualization services is referred to as the Virtualization Stack 310. The Virtualization Stack 310 subcomponent that implements memory virtualization for the Partitions 304 is named the VSMM (Virtualization Stack Memory Manager) 312. Because it is the hypervisor 306 that owns the underlying hardware resources 306, the VSMM 312 makes extensive use of hypervisor services when performing Partition memory virtualization. FIG. 3 shows the hypervisor 308 as the bottommost software layer that sits between the Virtualization Stack 310 and the actual hardware 306. The Virtualization Stack 310 in general, and the VSMM 312 in particular, utilize the hypervisor 308 services in order to create and manage isolated Partitions 304. Note that the VSMM 312 utilizes the memory related hypervisor services 314 while other components in the Virtualization Stack 312 utilize different hypervisor services 316.

Each Partition 304 created by the Virtualization Stack has its own physical address space that is isolated from the physical address spaces of other Partitions 304. In order to provide this isolation, a certain level of indirection is required between what the guest OS refers to as physical addresses and the underlying machine physical addresses used by the processor when accessing memory. The hypervisor 308 defines the Guest Physical Address (GPA) space to be the set of memory pages that are referred to by the guest OS as physical pages; that is, whenever the guest references a physical address (for example, when the CR3 register is loaded with the physical address of the page directory), the reference is to a page within the GPA space. The hypervisor 308 defines the System Physical Address (SPA) space to be the set of the real machine's physical addresses. There is one SPA space per machine and there is one GPA space per Partition 304. Even though the guest references a GPA page when referencing physical memory, these references must be converted at some point such that the actual memory access is performed on an SPA page. In other words, the GPA space is simply an abstraction layer and whenever the processor is executing guest code, it has to access SPA pages when referencing physical memory. In order to perform the aforementioned conversion, GPA-to-SPA mappings are required.

Figure 4:
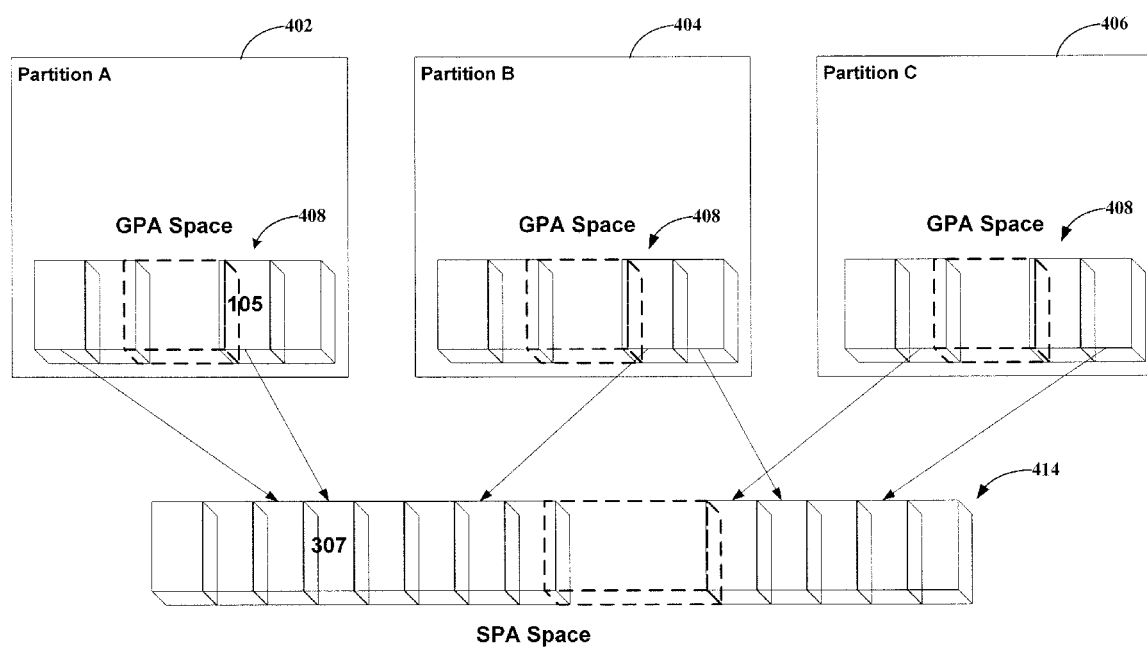
FIG. 4 illustrates, as an example, the hypervisor of FIG. 3 Guest Physical Address (GPA) to System Physical Address (SPA) mappings.

Referring next to FIG. 4, illustrated, as an example, is the hypervisor of FIG. 3 GPA-to-SPA mappings. FIG. 4 shows three Partitions (Partition A 402, Partition B 404, and Partition C 406) created by the Virtualization Stack 310, each having its own GPA space 408. Pages in each GPA space 408

"point" to SPA pages 414. When, for example, the processor is executing code of the guest OS that resides within Partition A 402, and an instruction accesses memory in GPA page number 105, the underlying page that will be accessed is SPA page number 307. The hypervisor uses and keeps track of the GPA-to-SPA mappings, but it is the Virtualization Stack 310 (the VSMM 312 in particular) that sets these mappings.

The x86 and x64 processor architectures have a built-in Virtual Memory support (in the MMU). This means that the instructions executed by the CPU use Virtual Addresses rather than Physical Addresses when referencing memory. The MMU translates Virtual Addresses to Physical Addresses using data structures known as Page Tables provided by the OS. When the OS runs on real hardware, it uses the CR3 register in order to store the physical address of the Page Directory. The Page Directory contains information about the various Page Tables that describe the different Virtual Address regions. Each Page Table, in turn, contains information about the physical memory pages. Therefore, in order to translate a Virtual Address to a Physical Address, the MMU has to access the Page Directory, the appropriate Page Table and then the appropriate entry in the Page Table (i.e., the PTE) in order to find out which physical page is mapped to the Virtual Address in question.

Since doing additional memory lookups for every reference to a Virtual Address would result in unacceptable system performance, most CPUs cache address translations so that repeated accesses to the same addresses don't have to be retranslated. The processor provides such a cache in the form of an array of associative memory called the TLB (Translation Look-aside aside Buffer). The TLB contains the virtual-to-physical page mappings of the most recently used pages. Virtual Addresses that are used frequently are likely to have entries in the TLB, which provides extremely fast virtual-to-physical address translation and, therefore, fast memory access. If a Virtual Address isn't in the TLB, it might still be in memory, but multiple memory accesses are needed to find it, which makes the access time slightly slower.

The x86 and x64 processor architectures define two page sizes. Small pages that are generally 4 KB and large pages that are generally 2 MB. When a Virtual Address is mapped to a large page, the corresponding Page Directory Entry (PDE) points to the physical large page (instead of pointing to the Page Table containing the entry that further points to the small physical page). This means that address translation is going to take less time because the CPU has to access only the Page Directory in order to figure out which physical memory address should be referenced. The advantage of large pages is speed of address translation for references to other data within the large page. This advantage exists because the first reference to any byte within a large page will cause the hardware's TLB to have in its cache the information necessary to translate references to any other byte within the large page. If small pages are used, more TLB entries are needed for the same range of Virtual Addresses, thus increasing recycling of entries as new Virtual Addresses require translation. This, in turn, means having to go back to the page table structures when references are made to virtual addresses outside the scope of a small page whose translation has been cached. The TLB is a very small cache, and thus large pages make better use of this limited resource. Generally, the Operating System maps with large pages the core OS images as well as core OS data.

When the Operating System runs within a hypervisor Partition 304, the guest instructions executed by the processor don't directly reference the aforementioned GPA. Instead, they reference Guest Virtual Addresses (GVA). One defines the GVA space as the virtual address space that the guest OS as well as applications running within the guest OS use when referencing memory. For example, the GVA space on a 32 bit guest OS is 4 GB. The GVA space changes when process context switches occur within the guest (when the guest tries to load a different GPA into the CR3 register). Normally, virtual-to-physical address translation is done by the processor using Page Tables provided by the OS. However, when the OS is running within a Partition 304, the guest Page Tables reference what the guest thinks is physical memory, which is actually the GPA space memory. Therefore, when executing guest instructions, the hypervisor 308 provides the CPU with an alternate set of page tables that are named the Shadow Page Tables (SPTs) in order to make sure that the appropriate GVA-to-SPA translation is performed (rather than GVA-to-GPA translation).

As an example, suppose that in the GPA 408 to SPA 414 mappings diagram of FIG. 4, the guest Page Tables of Partition A 402 are set such that a certain GVA is mapped to GPA page number 105. The hypervisor 308 will have to populate the Shadow Page Tables associated with Partition A 402 such that the same Guest Virtual Address is associated with SPA page number 307. The hypervisor 308 is able to appropriately populate the Shadow Page Tables because it is capable of reading the guest Page Tables and because it knows the SPA page 414 that is associated with any GPA page 408. The hypervisor 308 knows where the guest Page Tables reside because it can detect when the guest tries to load the GPA of the Page Directory into the CR3 register.

The guest OS indicates the use of a large GPA page by setting a certain bit in the appropriate Page Directory Entry. A large SPA page is defined, as an example, to be a 2 MB contiguous region of SPA space memory that is naturally aligned. By naturally aligned one means that the large page starts at an SPA that is aligned according to how large the page is (i.e., divisible by 2 MB if the page is 2 MB). When the hypervisor 308 needs to populate the Shadow Page Tables, it will probably not be able to map the large GPA pages to large SPA pages.

Figure 5:
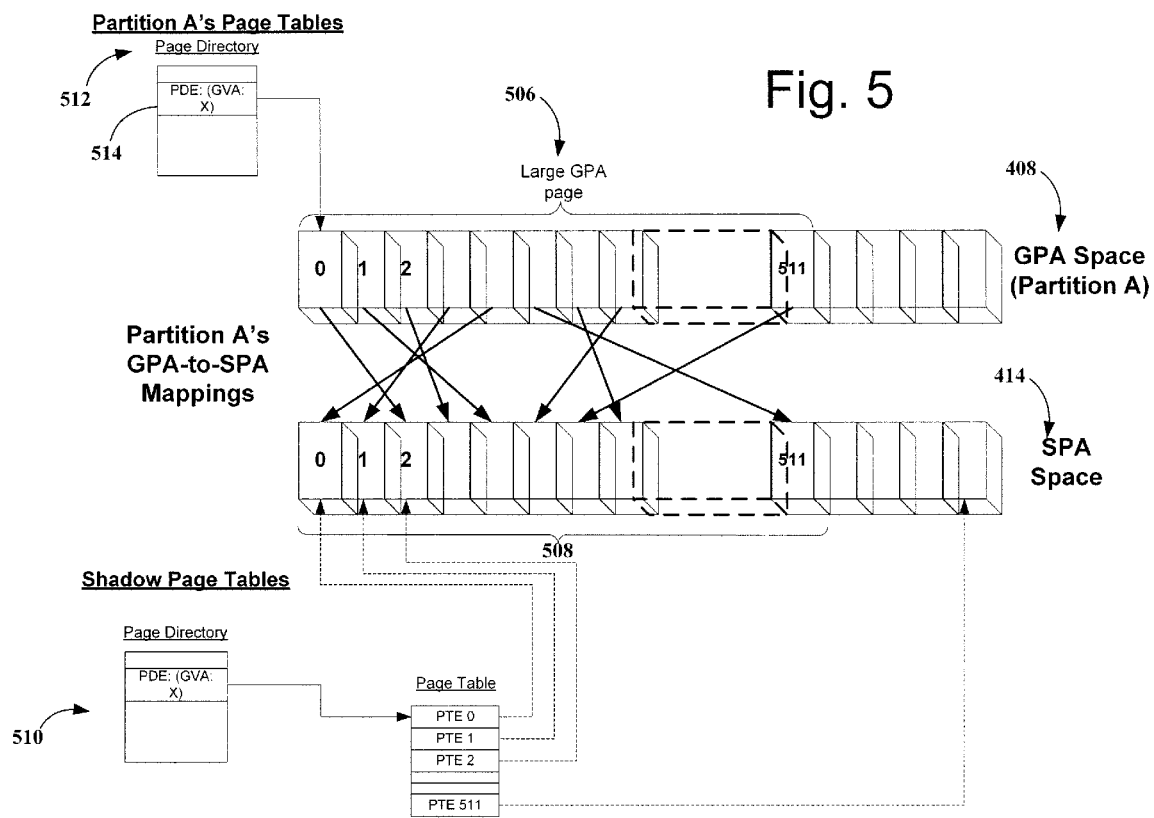
FIG. 5 illustrates, as an example the GPA-to-SPA mappings of Partition A of FIGS. 3 and 4.

Referring next to FIG. 5, illustrated, as an example, is the Guest Physical Address (GPA) to System Physical Address (SPA) mappings of Partition A of FIG. 3. The SPA memory associated with the first 512 GPA pages 506 is a set of arbitrary SPA pages 508 that the VSMM 312 decided to associate with Partition A's GPA space 408. Partition A's guest Page Tables indicate that Guest Virtual Address (GVA) X 512 translates to a large GPA page that starts at GPA 0; that is, GPA pages 0 through 511 506 (512 pages total which is 2 MB—the size of a large page in the current example) are actually a large page, from the guest's perspective. When the hypervisor 308 needs to populate the Shadow Page Tables 510 so that the right GVA-to-SPA translation can take place for GVA X 514, it can't use a large SPA page in the Shadow Page Tables 510, because the SPA memory 508 that is associated with the large GPA 506 page is not contiguous. Therefore, the hypervisor 308 populates Partition A's Shadow Page Tables 510 with small pages. This means that the address translation is going to be slower than what it would have been if the guest had run on the physical hardware 306 and not within a Partition 304.

A first optimization process introduced uses an opportunistic algorithm that, at times, allows the hypervisor 308 to map large GPA pages to large SPA pages and thus achieves a better utilization of the processor's TLB. The process is implemented by the VSMM 312 and the hypervisor 308.

Following is a description of an example of the process:
1. When the VSMM 312 is asked to back a new Partition's GPA space 408 with SPA memory 414, it attempts to allocate as many large SPA 414 pages as possible.
2. When populating the Partition's GPA space 408, the VSMM 312 associates the previously-allocated large SPA 414 pages with contiguous (and naturally-aligned) portions of the Partition's GPA 408 space.
3. The hypervisor 308 populates the Shadow Page Tables 510 with a large SPA page mapping if the following conditions are true:
   A large GPA 408 page is mapped into a GVA by the guest OS.
   The hypervisor 308 finds 512 consecutive 4K Shadow Page Table (SPT) 510 entries.
   All the SPT entries have the same attributes (access rights, etc.)
4. If at least one of the three above conditions is not true, then the hypervisor will populate the Shadow Page Tables 510 with an SPT that points to a small (4K) SPA 414 page.

Essentially, the hypervisor 308 "discovers" the large SPA pages allocated by the VSMM 312 as it populates the Shadow Page Table Entries 510 with small SPA 414 pages.

Figure 6:
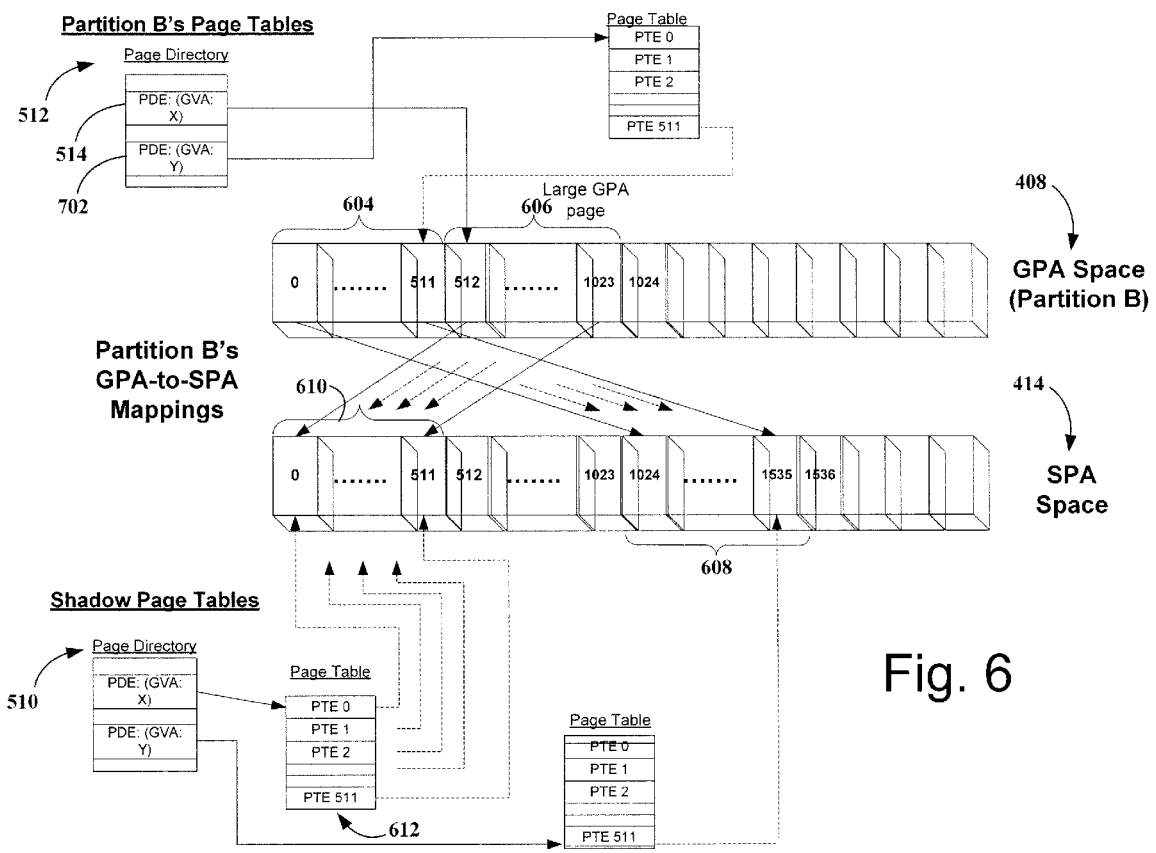
FIG. 6 illustrates, as an example, the state of the guest page tables of Partition B of FIGS. 3 and 4 as well as the Shadow Page Tables right before the hypervisor of FIG. 3 modifies the Shadow Page Tables to use SPA page number 0 as a large page.

Referring next to FIG. 6, illustrated, as an example, is the state of the guest page tables of Partition B 404 of FIGS. 3 and 4 as well as the Shadow Page Tables 510 right before the hypervisor 308 of FIG. 3 modifies the Shadow Page Tables 510 to use SPA page number 0 610 as a large page. In the present example, when Partition B 404 was created, the VSMM 312 backed the first 4 MB of the Partition's GPA space with two large SPA pages 608 610. Note that the two SPA pages 608 610 aren't adjacent in SPA space 414 even though the corresponding GPA pages 604 606 are adjacent. This fact doesn't have any impact on the correctness of the process. The guest Page Tables indicate that GPA page number 512 606 is mapped into GVA X 514 as a large page. After Partition B 404 started running, the hypervisor 308 populated the Shadow Page Tables 510 with small SPA pages 0 through 511 610.

At this point, the hypervisor 308 performs the checks outlined in step 3 of the opportunistic mapping process described above. The three conditions using the present example that are checked in this step to be true are:
1. The guest mapped a large GPA page (e.g., GPA small page numbers 512 through 1023) 606 to GVA X 514.
2. There are 512 consecutive 4K SPTs 612 that correspond to GVA X 514.
3. All the pages are mapped with the same protection.

Therefore, the hypervisor 308 can modify the Shadow Page Tables 510 to use a large SPA page for GVA X 514 instead of using 512 consecutive 4K pages.

Figure 7:
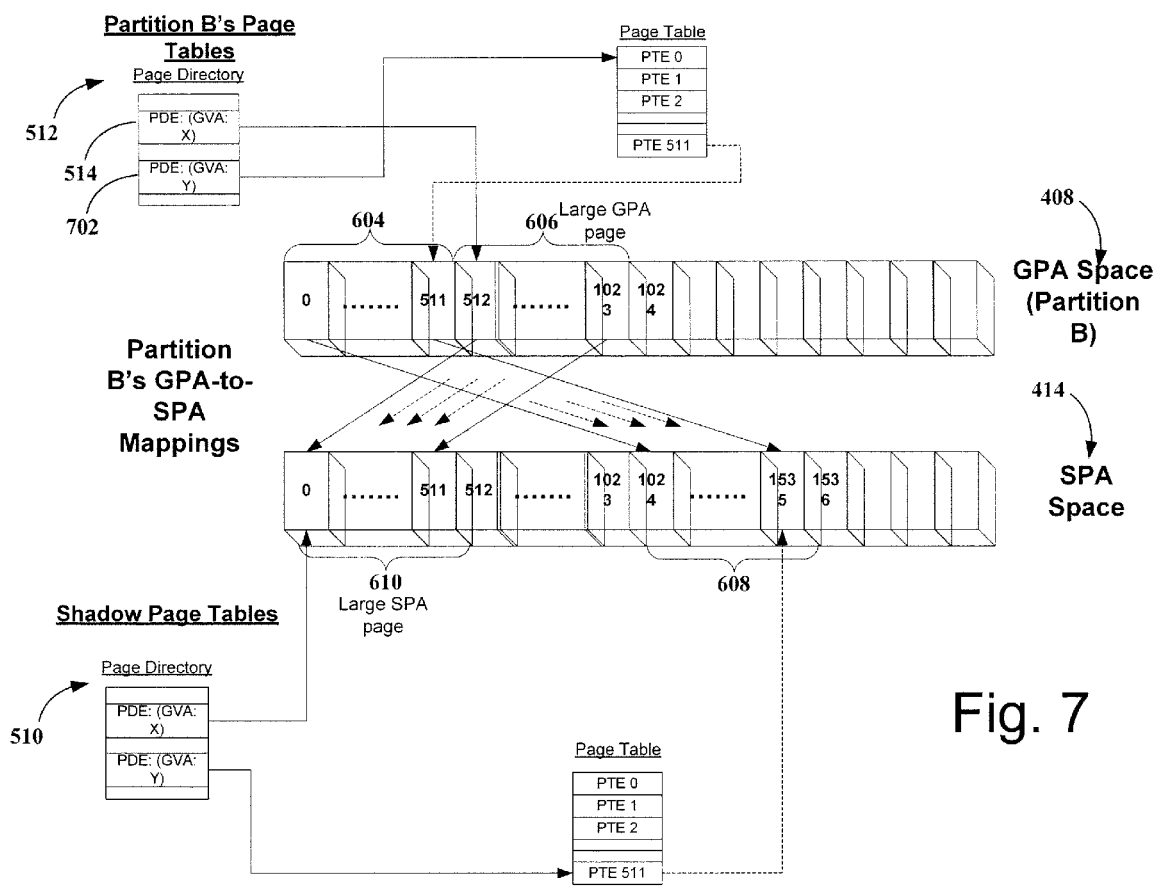
FIG. 7 illustrates, as an example, the state of the shadow page tables after the hypervisor of FIG. 3 modifies the page directory entry to point to a large page according to opportunistic large page mapping.

Referring next to FIG. 7, illustrated, as an example, is the state of the shadow page tables 510 after the hypervisor 308 of FIG. 3 modifies the page directory entry to point to a large page according to opportunistic large page mapping. Note that the guest mapped GPA page number 511 as a 4K page into GVA Y 702. GPA page number 511 is mapped to SPA page number 1535, which is part of one of the large SPA pages the VSMM 312 allocated during Partition B's 404 creation. Therefore, the Shadow Page Tables 510 are going to be populated with a 4K SPA page for GVA Y 702 and the large SPA page allocated by the VSMM 312 (SPA page numbers 1024 through 1535 608) is not going to be mapped into a GVA as a large page (as long as the guest doesn't map it as a large page, which is something over which the hypervisor 308 has no control in the present example). The above situation demonstrates a shortcoming of this process.

The process the VSMM 312 uses when mapping large SPA pages to large GPA pages is guest OS agnostic; that is, the VSMM 312 does not have any knowledge as to which areas of the Partition GPA 408 space are likely to be mapped by the guest OS as large pages. Therefore, the VSMM 312 either arbitrarily chooses the large GPA pages that it will map with large SPA pages or it can start mapping adjacent GPA large pages starting from the beginning of the GPA space. In the latter case, the VSMM 312 maps large pages until it can't find more available large SPA pages or when all the required GPA memory for the Partition has been populated.

The following describes Mapping Large SPA Pages "On Demand." The process described above doesn't require exchanging information between the VSMM 312 and the hypervisor 308 about the state of the guest Page Tables. However, since the process is opportunistic, there is a chance that large SPA pages allocated by the VSMM 312 will never be used as large SPA page in the Shadow Page Tables 510. The description below introduces, as an example, an additional large page optimization process that provides a solution to this problem.

As explained earlier, performing memory virtualization for the guest OS requires the hypervisor 308 to access the guest page tables so that the Shadow Page Tables 512 can be populated appropriately. Therefore, the hypervisor 308 knows which GPA pages are mapped into the GVA space as large pages. If the VSMM 312 could obtain that information from the hypervisor 308, then it could map the right regions of the GPA space 408 with large SPA pages. This will prevent a situation in which the VSMM 312 allocates a large SPA page and maps it into the GPA space 408 such that the page doesn't end up in the Shadow Page Tables 510 as a large SPA page. This is important especially because large SPA pages are a scarce resource and they become harder to allocate after the system has been up and running for an extended period of time.

In order to perform the large page optimization, the VSMM 312 maintains a pool of large SPA pages. The VSMM 312 allocates large SPA pages and puts them in the pool when the system is initialized (before the creation of any Partition 304). When the VSMM 312 is asked to allocate SPA memory and set the GPA-to-SPA mappings for a newly created Partition 304, it allocates only small (e.g., 4K) SPA pages and it doesn't use the previously allocated large SPA pages that reside in the pool. After the guest OS has been running for a certain period of time, the large SPA page mapping process staffs. The large SPA page mapping process may comprise, for example, two parts: one performed by the VSMM 312 and the other performed by the hypervisor 308. Following is a pseudo code describing the VSMM 312 part of the process:

```
IF (Large SPA Page Pool is empty)
   EXIT
ELSE
   LargeGpaPageList = QueryPartitionLargeGpaPages(PartitionX)
   IF (LargeGpaPageList is empty)
      EXIT
   ELSE
      FOR EACH LargeGpaPage IN LargeGpaPageList
      BEGIN
         IF (Large SPA Page Pool is empty)
            EXIT
         ELSE
            Get new large SPA page from the pool
            Copy SPA contents from LargeGpaPage to large SPA page
            Set PartitionX's GPA-to-SPA Mappings (large SPA page)
         END
```

The VSMM 312 checks whether there are large SPA pages in the pool. If there are't free large SPA pages, then the SVMM 312 does nothing. If the pool is not empty, then the VSMM 312 queries the hypervisor 308 for the list of large GPA pages that the guest mapped into its GVA as large pages (note that the process refers to a specific Partition—PartitionX in this example—and the VSMM 312 eventually applies the process to all the Partitions). If the list retrieved from the hypervisor 308 is empty, it means that no large SPA pages are required and the VSMM 312 doesn't do anything. If the list is not empty, then the VSMM 312 replaces the existing GPA-to-SPA mappings so that the reported large GPA pages point to large SPA pages. Doing this is not trivial, though, because the existing SPA pages contain data that should be copied into the new large SPA pages before the GPA-to-SPA mappings can be adjusted. Also, the VSMM 312 makes sure that the Partition 304 doesn't access the underlying SPA pages while the SPA memory 414 is copied.

Once the VSMM 312 maps the new set of large SPA pages, the hypervisor 308 needs to populate the Shadow Page Tables 510 such that the large SPA pages are used. Before describing the process used by the hypervisor 308 when populating the page tables, it is important to note that when the VSMM 312 sets the new GPA-to-SPA mappings that are associated with the large SPA pages, the hypervisor 308 automatically flushed the Shadow Page Tables 510; that is, because the underlying SPA pages have changed, the current GVA-to-SPA mappings are no longer valid and therefore the hypervisor 308 needs to repopulate the Shadow Page Tables 510. The processor "informs" the hypervisor 308 that an entry is missing in the Shadow Page Tables 510 by generating a page fault. Following is a pseudo code that describes what the hypervisor 308 does when processing a page fault in order to map in the large SPA pages:

```
IF (Guest Maps GVA to a large GPA Page)
    IF (Large GPA page maps to a large SPA page)
        Set Shadow Page Directory Entry to point to large SPA page
    ELSE
        Set Shadow Page Table Entry to point to small SPA page
ELSE
    Set Shadow Page Table Entry to point to small SPA page
```

When the hypervisor 308 handles a page fault, it first looks at the information in the guest page tables. If the guest page tables indicate that the GVA in question is backed by a large GPA page, the hypervisor 308 checks whether the GPA-to-SPA mappings for the large GPA page are set such that the underlying SPA memory is actually a large SPA page (2 MB, naturally aligned SPA page). If the hypervisor 308 discovers a large SPA page, it most probably means that the VSMM 312 created these GPA-to-SPA mapping after querying for the guest large GPA pages (this is done by the VSMM 312 part of the process described earlier). The hypervisor 308 will therefore populate the Shadow Page Directory with a PDE (Page Directory Entry) that points to the large SPA page. If the large GPA page is not backed by a large SPA page, then the hypervisor 308 will point to a small (4K) SPA page from the appropriate SPT entry.

The manner in which the VSMM 312 manages the large SPA page pool as well as the manner in which the VSMM 312 chooses the Partition to which it is going to apply the optimization are not directly related to the large SPA page optimization. However, the VSMM 312 performs a certain level of load balancing so that the large SPA pages are evenly spread across the GPA spaces of the running Partitions. Also, in addition to allocating large SPA pages when the system is initialized, the VSMM 312 also keeps track of the large SPA pages that are currently in use by the various Partitions. This way, when a Partition is destroyed, its large SPA pages are put back into the large SPA page pool so that they can be used by other Partitions.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer implemented method for utilizing memory pages in a virtual machine environment comprising:
    detecting system physical address (SPA) pages of a particular size allocated by a system component, as corresponding shadow page table entries are populated with references to SPA pages of a smaller size than the SPA pages of the particular size allocated by the system component; and
    associating previously-allocated SPA pages of a particular size with contiguous and naturally-aligned portions of a partition's Guest Physical Address (GPA) space, wherein large physical memory pages are utilizable by a guest operating system (OS).

2. The method of claim 1 wherein the detecting comprises:
    populating shadow page tables (SPTs) with an SPA page mapping to pages of the particular size when the following three conditions are true: a GPA page of the particular size is mapped into a guest virtual address by the OS, appropriate consecutive shadow page table entries are found, and all SPT entries have the same applicable attributes; and
    populating the SPTs with a SPT entry that points to a page smaller than the particular size if one of the above three conditions is not true.

3. The method of claim 2 further comprising attempting to allocate as many SPA pages of the particular size as possible when a component of the virtual machine is asked to back a new partition's GPA space with SPA memory.

4. The method of claim 2 wherein the particular size is 2 MB and the SPA pages of a smaller size are any that are 4 KB and below.

5. The method of claim 3 wherein the component of the virtual machine that is asked to back a new partition's GPA space with SPA memory is a memory management component that resides outside of a hypervisor.

6. The method of claim 5, wherein exchanging information between the memory management component and a lower-level system component that owns and controls certain machine resources for system memory is not required.

7. A computer readable storage medium having instructions thereon for performing the method of claim 1.

8. A computer readable storage medium having instructions thereon for performing the method of claim 2.

9. A computer readable storage medium having instructions thereon for performing the method of claim 3.

10. A computer readable storage medium having instructions thereon for performing the method of claim 4.

11. A computer readable storage medium having instructions thereon for performing the method of claim 5.

12. A computer readable storage medium having instructions thereon for performing the method of claim 6.

13. A computer implemented system for utilizing large memory pages in a virtual machine environment comprising:
   means for detecting system physical address (SPA) pages of a particular size allocated by a system component, as corresponding shadow page table entries are populated with references to SPA pages of a smaller size than the SPA pages of the particular size allocated by the system component;
   memory for storing the shadow page table entries; and,
   means for associating the previously-mapped (SPA) pages of a particular size with contiguous and naturally-aligned portions of a partition's guest physical address (GPA) space;
   wherein a guest operating system (OS) can utilize large physical memory pages.

14. The system of claim 13 wherein the detecting comprises:
   means for populating shadow page tables (SPTs) with an SPA page mapping to pages of the particular size when the following three conditions are true: a GPA page of the particular size is mapped into a guest virtual address by the OS, appropriate consecutive shadow page table entries are found, and all SPT entries have the same applicable attributes; and
   means for populating the SPTs with an SPT entry that points to a page smaller than the particular size if one of the above three conditions is not true.

15. The system of claim 14 further comprising means for attempting to allocate as many SPA pages of the particular size as possible when a component of the virtual machine is asked to back a new partition's GPA space with SPA memory.

16. The system of claim 14 wherein the particular size is 2 MB and the SPA pages of a smaller size are any that are 4 KB and below.

17. The system of claim 14 wherein the component of the virtual machine that is asked to back a new partition's GPA space with SPA memory is a memory management component that resides outside of a hypervisor.

18. The system of claim 17, wherein the system does not require exchanging information between the memory management component and a lower level system component that owns and controls applicable machine resources for system memory.

19. A method for utilizing memory pages in a virtual machine environment comprising:
   checking for system physical address (SPA) pages of a corresponding particular size SPA pages in a pool of SPA pages of the particular size;
   if there are SPA pages of a particular size SPA pages in the pool, then querying for a list of large Guest Physical Address (GPA) pages of the particular size that a guest mapped into its guest virtual Address (GVA) space as pages of the particular size;
   if the list is retrieved and is not empty, then replacing existing guest physical address-to-system physical address (GPA-to-SPA) mappings so that reported large GPA pages in the list of the particular size point to SPA pages of the particular size;
   automatically flushing shadow page tables; and
   populating the shadow page tables such that the large SPA pages of the particular size are used, wherein large physical memory pages are utilizable by a guest operating system (OS).

20. A computer readable storage medium having instructions thereon for performing the method of claim 19.

* * * * *

UNITED STATES PATENT AND TRADEMARK OFFICE
CERTIFICATE OF CORRECTION

| | | |
|---|---|---|
| PATENT NO. | : 7,475,183 B2 | Page 1 of 1 |
| APPLICATION NO. | : 11/299409 | |
| DATED | : January 6, 2009 | |
| INVENTOR(S) | : Eric P. Traut et al. | |

It is certified that error appears in the above-identified patent and that said Letters Patent is hereby corrected as shown below:

In column 12, line 42, delete "staffs." and insert -- starts. --, therefor.

Signed and Sealed this
Tenth Day of May, 2011

David J. Kappos
*Director of the United States Patent and Trademark Office*